United States Patent [19]
Slavin

[11] 3,804,447
[45] Apr. 16, 1974

[54] FRICTION BUMPER

[76] Inventor: Harry Slavin, 25631 Greenfield, Southfield, Mich. 48075

[22] Filed: Dec. 13, 1971

[21] Appl. No.: 207,426

[52] U.S. Cl. .................. 293/89, 293/85, 188/1 B, 267/9 C
[51] Int. Cl. .................. B60r 19/06, F16f 7/08
[58] Field of Search .............. 293/1, 60, 68, 70, 85, 293/89, 99; 188/1 B; 213/22, 37, 38, 39; 267/9 R, 9 A, 9 B, 9 C

[56] References Cited
UNITED STATES PATENTS

| | | | |
|---|---|---|---|
| 2,601,981 | 7/1952 | Lehrman | 267/9 A |
| 1,696,429 | 12/1928 | Christen | 293/85 |
| 2,552,667 | 5/1951 | Dath | 213/22 |
| 1,918,573 | 7/1933 | Tibbetts | 105/197 D |
| 1,647,627 | 11/1927 | Horowitz | 293/71 R |
| 2,565,650 | 8/1951 | Dath | 213/22 |

Primary Examiner—Robert G. Sheridan
Assistant Examiner—Robert Saifer
Attorney, Agent, or Firm—Cullen, Settle, Sloman & Cantor

[57] ABSTRACT

A double bar bumper construction for automobile vehicles characterized by means incorporated within the construction for providing frictional resistance against relative longitudinal movement of the two bumper bars of the construction.

9 Claims, 7 Drawing Figures

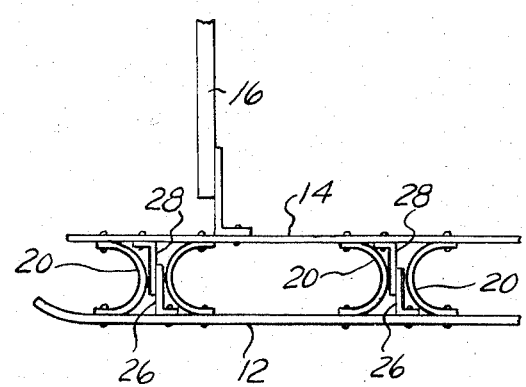
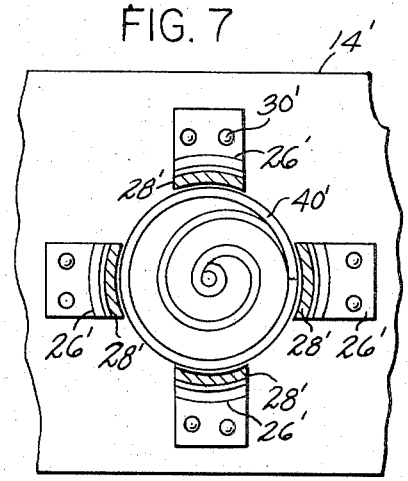
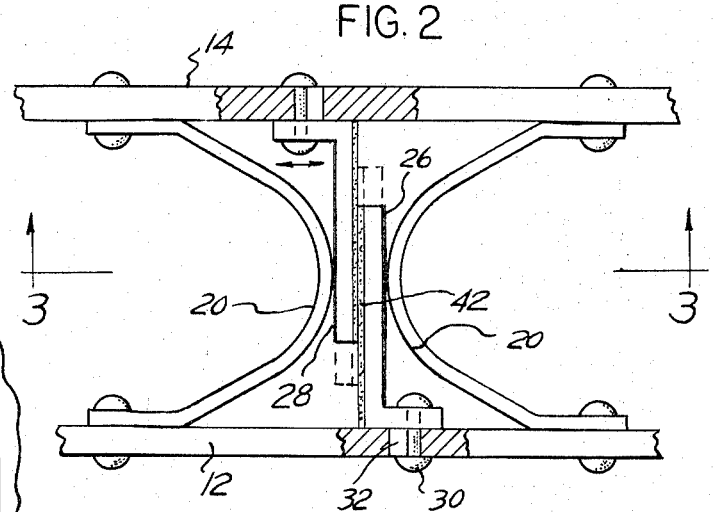
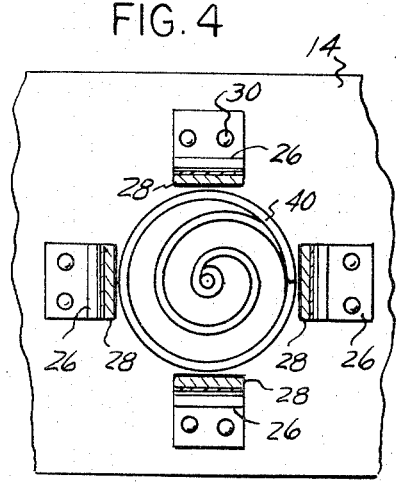
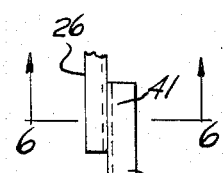
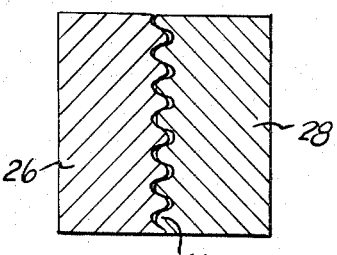
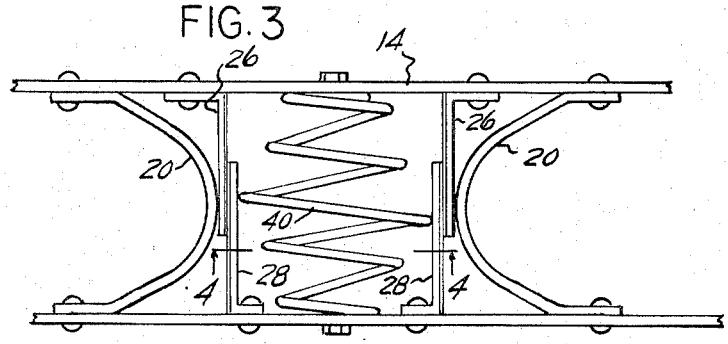

FRICTION BUMPER

GENERAL DISCUSSION

The art (Weiland long been aware of vehicle bumpers of double bar construction with resilient means between the bars. Nicholas U.S. Pat. No. 1,715,379 of June 4, 1929 shows such a construction. The art has also been aware of bumper constructions employing piston cylinder type means incorporated within a bumper construction. An example is shown in Hatashita U.S. Pat. No. 1,438,177. Other types of bumper constructions characterized by the inclusion of collapsible air filled cushioning means (weiland U.S. Pat. No. 1,579,186), enclosed springs (Jezek U.S. Pat. No. 1,503,049), leaf springs (Banschbach U.S. Pat. No. 1,505,365), coil springs (Nicholson U.S. Pat. No. 846,599), as well as other types (Osman U.S. Pat. No. 2,247,664, Scheutz U.S. Pat. No. 1,997,752).

It seems, therefore, that over the years much attention has been given to designing bumper constructions with a variety of incorporated means for improving the functioning of the bumpers. In this application, I disclose a novel bumper construction characterized by the inclusion of braking means within the bumpers, and the provision of such braking means is believed to be novel and forms a principal basis for this application.

THE EMBODIMENTS DISCLOSED

In the appended drawing I disclose, more or less diagrammatically and without significant attention to details of construction which are well within the skill of designers desiring to implement my inventive concept of braking means within the bumpers, preferred embodiments, presently preferred, of my inventive concepts.

In such drawing:

FIG. 1 is a top plan view diagrammatically disclosing one simple form of the present invention.

FIG. 2 is an enlarged fragmentary detail view of FIG. 1.

FIG. 3 is a view like FIG. 2 but showing a somewhat modified form.

FIG. 4 is a section taken on line 4—4 of FIG. 3.

FIG. 5 is a fragmentary detail of a still further modified form of some of the elements of the present invention.

FIG. 6 is a section taken on lines 6—6 of FIG. 5, on an increased scale.

FIG. 7 is similar to FIG. 4 showing a modification.

DETAILED DISCLOSURE

The drawing shows an automobile bumper construction which may be formed as an original equipment bumper to be attached directly to a vehicle frame, or it may be provided as a replacement bumper, also to be attached directly to a vehicle frame replacing a removed bumper, or it may be an auxiliary bumper attached to an existing bumper.

The bumper construction comprises two substantially parallel transverse bars, a forward bar 12 and a rearward bar 14, the latter being shown as connected directly to vehicle frame members 16.

Between the bumper bars 12 and 14 are laterally and longitudinally distortible resilient means between and connecting the bumper bars. FIGS. 1 and 2 show such means as in the form of C-shaped leaf springs 20 with three pairs of such leaf springs being shown in FIG. 1, for illustration.

At this point we turn to the precisely novel features of the present invention; namely, cooperating and mutually engaging longitudinally extending braking elements on and between the bars. FIGS. 1 and 2 show these braking elements as in the form of engaging and cooperating brackets 26, 28 having interengaging longitudinally extending shanks and transverse mounting bases for mounting the elements 26 and 28 on the bumper bars. The drawing discloses three pairs of such braking elements 26–28 with each pair located between a pair of leaf springs 20. As shown in FIG. 2, fasteners 30 are positioned in slots 32 to facilitate relative lateral movement between elements 26–28.

In FIG. 4, there are two pairs of spaced braking elements 26–28 arranged in a circle. At least one pair thereof or both pair may be engaged by corresponding adjacent C-shaped springs 20 as shown in FIG. 1. Outward force is also provided by spring 40 to increase frictional effect.

FIG. 5 shows a corrugated form 41 of surfacing of the cooperating faces of the braking elements 26–28 for enhancing the braking action and functioning similarly but superiorly to the brake lining type of facing shown at 42 of the braking elements 26–28 shown in FIGS. 1 and 2. Lining 42 may be an asbestos composition.

Other features of construction may also be incorporated and since these are well within the skill of designers, they are not disclosed in the drawings but are mentioned here. For example, water proofing boots or covers may be provided to enclose the pairs of resilient leaf springs 20 and the braking elements 26–28 of FIGS. 1 and 2 and may also be provided to enclose the similarly operating means of the forms of FIGS. 3 and 4 disclosed in the drawing.

OPERATION

Normally the parts are in the condition shown in FIGS. 1 and 2 as well as in FIGS. 3 and 4 with the faces of the braking elements being in minimum frictional interengagement and with the resilient means 20 being so positioned that they provide either no engagement with the braking elements or minimum engagement with such braking elements, either as desired.

On impact against the forward bar 12, as in a collision, the resilient elements 20 will distort longitudinally as would normally be expected but beyond that, and as would not normally be expected, would distort laterally to cause the resilient means 20 to engage and bias the braking elements 26–28 laterally into maximum frictional braking engagement. The longitudinal and the lateral relative movement of the braking elements against and with respect to each other creates a braking reaction which causes the bumper bars to be restrained in their longitudinal relative movements and this is caused by the braking coaction of the braking elements.

While the drawing in FIGS. 1 and 2 shows the leaf springs 20 normally out of contact with the braking elements, it will be understood that if desired, they may be so proportioned that they will be lightly but, nevertheless, in positive contact with the braking elements. The distortion caused by collision will greatly increase the bias of the resilient members 20 on the braking elements 26–28 for producing the desired braking effect.

Equipped with an understanding of the action of the braking elements, it can now be seen that such action takes place whether the braking elements are of bracket form as in FIGS. 1, 2 and 4 or in any other form that may be contemplated; and that braking coaction is enhanced by the provision of brake lining 42 as in FIGS. 1, 2 and 4 or the ridge formation 41 as in FIG. 5.

Likewise, having acquired an understanding of the braking coaction that takes place in the construction disclosed, it can readily be seen that such action, initiated by the lateral distortion of the resilient means 20 may take place whether such means are of the C-form herein disclosed or of any other form such as the auxiliary resilient means 40 shown in FIGS. 3 and 4.

Likewise, it can be understood that the braking action can be enhanced by the inclusion in the device of two sets of resilient members; namely, the leaf springs 20 as well as the coil springs, all shown in FIGS. 3 and 4.

It will, of course, be understood that great variation in dimensions, precise forms, and mountings of the various parts is available to those skilled in the designing of bumper constructions and that such changes are not to be construed as departures from the inventions sought to be protected in this application, whose scope is to be determined by the following claims which point out and distinctly claim the cooperation and coaction of the parts forming the bumper construction of the invention.

It will be understood that the braking elements 26', 28', may be transversely arcuate as in FIG. 7.

I claim:

1. In an automobile bumper construction, which may be an original equipment bumper, or a replacement bumper, or an auxiliary bumper attached to an existing bumper;
    two substantially parallel transverse bars;
    laterally and longitudinally distortable leaf springs between and connecting them;
    cooperating and mutually engaging longitudinally extending braking elements on and between the bars;

with the springs and the braking elements being so formed and located that lateral distortion of the springs, caused by collision impact on one of the bars and accompanied by longitudinal distortion of the springs causes the springs to engage and frictionally bias the braking elements laterally into maximum frictional braking engagement, whereby the longitudinal and lateral relative movements of the braking elements against and with respect to one another, creates a braking reaction which causes the bumper bars to be restrained in their longitudinal relative movements, by the braking coaction of the braking elements.

2. A construction according to claim 1 wherein the springs are leaf springs of C form.

3. A construction according to claim 1 wherein the springs, normally and when not distorted lightly engage the braking elements for lightly biasing them into minimum braking coengagement.

4. A construction according to claim 1 wherein the braking elements are of bracket form having interengaging longitudinally extending shanks and transverse mounting bases for mounting the elements on the bars.

5. In the construction of claim 4, the braking elements being mounted for lateral shifting on said bars.

6. In an automobile bumper construction, which may be an original equipment bumper, or a replacement bumper, or an auxiliary bumper attached to an existing bumper;
    two substantially parallel transverse bars;
    laterally and longitudinally distortable springs between and connecting them;
    cooperating and mutually engaging longitudinally extending braking elements on and between the bars;

with the springs and the braking elements being so formed and located that lateral distortion of the springs, caused by collision impact on one of the bars and accompanied by longitudinal distortion of the springs causes the springs to engage and frictionally bias the braking elements laterally into maximum frictional braking engagement, whereby the longitudinal and lateral relative movements of the braking elements against and with respect to one another, creates a braking reaction which causes the bumper bars to be restrained in their longitudinal relative movements, by the braking coaction of the braking elements;
    there being a series of pairs of said braking elements arranged in a circle, said springs including a coiled compression spring arranged centrally of each series of said braking elements adapted for a lateral distortion and operative outward engagement therewith.

7. In the construction of claim 6, said braking elements being transversely arcuate.

8. In the construction of claim 1, a plurality of interengaging, opposed, longitudinal corrugations formed in the opposed faces of the braking elements for increased surface frictional engagement therebetween.

9. In a bumper construction,
    two substantially parallel transverse bars;
    laterally and longitudinally distortable leaf springs between and connecting them;
    cooperating and mutually engaging longitudinally extending braking elements on and between the bars;

with the springs and the braking elements being so formed and located that lateral distortion of the springs, caused by collision impact on one of the bars and accompanied by longitudinal distortion of the springs causes the springs to engage and frictionally bias the braking elements laterally into maximum frictional braking engagement, whereby the longitudinal and lateral relative movements of the braking elements against and with respect to one another, creates a braking reaction which causes the bumper bars to be restrained in their longitudinal relative movements, by the braking coaction of the braking elements.

* * * * *